United States Patent [19]

Brun

[11] Patent Number: 4,874,559
[45] Date of Patent: Oct. 17, 1989

[54] PROCESS AND DEVICES FOR OPERATION OF AN APPARATUS WHICH FUNCTIONS BY USING A FLOW OF A LIQUID FILM

[75] Inventor: Pierre Brun, Grenoble, France

[73] Assignee: Compagnie Europenne Du Zirconium Cezus, Courbevoie, France

[21] Appl. No.: 298,896

[22] Filed: Jan. 19, 1989

[30] Foreign Application Priority Data

Jan. 21, 1988 [FR] France .................. 88 01006

[51] Int. Cl.$^4$ .................. B01F 3/04
[52] U.S. Cl. .................. 261/67; 261/112.1; 165/101; 165/115
[58] Field of Search .................. 165/101, 115; 261/67, 261/112.1

[56] References Cited

U.S. PATENT DOCUMENTS

| | | | |
|---|---|---|---|
| 1,671,586 | 5/1928 | Horwitz | 261/115 |
| 1,963,857 | 6/1934 | Lucas et al. | 165/115 |
| 2,392,601 | 1/1946 | Long | 261/67 |
| 3,820,765 | 6/1974 | Parton et al. | 261/67 |
| 3,871,444 | 3/1975 | Houser et al. | 165/101 |
| 4,021,531 | 5/1977 | Besson et al. | 423/81 |
| 4,274,477 | 6/1981 | Nikolie | 261/101 |
| 4,726,287 | 2/1988 | Gordes et al. | 261/112.1 |

Primary Examiner—Tim Miles
Attorney, Agent, or Firm—Dennison, Meserole, Pollack & Scheiner

[57] ABSTRACT

The invention concerns a process and an apparatus for maintaining a very thin film in an exchanger involving a flowing liquid film. The process wherein the liquid films are fed by gravity from a liquid source is characterised in that: each film is fed at the permanent flow ($kd_1$) corresponding to the feed flow rate ($d_1$) of the source; then for a short period of time the flow rate is increased to a transient value ($kd_2$) for establishing a continuous film over the whole of the corresponding flow surface; then operation returns to the flow rate ($kd_1$) for the film in question, the short periods of feeding the different films at their transient flow rates ($kd_2$) being displaced in respect of time. The apparatus according to the invention comprises at the top of each flow tube a movable sleeve, lifting movement or rotary movement of which opens a supplementary communication between the liquid source and the tube, permitting the film flow rate to assume the transient value ($kd_2$). The process is applied in particular to the process for separation of tetrachlorides of Zr and Hf.

17 Claims, 1 Drawing Sheet

PROCESS AND DEVICES FOR OPERATION OF AN APPARATUS WHICH FUNCTIONS BY USING A FLOW OF A LIQUID FILM

The invention concerns the field of exchangers involving a flowing liquid film and more particularly a process and an apparatus for maintaining a very thin film in such an exchanger.

KNOWN STATE OF THE ART

The procedure which involves a liquid film flowing over a surface is currently used in chemical engineering for operations involving either heat transfer between the liquid and the surface or heat transfer between the liquid and a gaseous phase or mass transfers between the liquid and the gaseous phase or a combination of such transfers. The liquid and gaseous phases may flow in counter-flow or co-flow relationship.

An important use is evaporation in the form of a thin layer in which one constituent at least of the liquid flowing along a heating wall is progressively brought to the conditions for vaporisation thereof. That involves a heat exchange between the hot wall and the liquid film and a mass transfer from the liquid phase to the gaseous phase.

A less widespread use involves causing a part of the gaseous phase to be absorbed by the liquid phase under closely defined conditions in respect of temperature.

The apparatuses which are suited for the transfer operations to be performed and to the physico-chemical properties of the materials being treated vary widely. Limiting the present considerations to those apparatuses which permit heat transfers with the flow surface, rotary apparatuses are used when a large amount of energy is required to produce a thin film on the surface, and apparatuses using a flow of liquid under the force of gravity are used when the viscosity and the surface tension of the liquid are low. The latter apparatuses generally comprise a vertical nest of tubes, each tube being provided in its upper part with a device for distributing the liquid and forming the film.

In order to provide optimum heat and mass transfers, the liquid film must be as thin as possible and should cover the entire surface. For apparatuses which involve a gravity flow, the works relating to chemical engineering set forth the teaching that the stability of the film requires the flow rate per unit of length of the delivery means to be greater than a minimum which can be calculated in dependence on specific gravity, viscosity and surface tension of the liquid under the conditions of the operation envisaged.

It has been noted that, if the minimum flow rate ($d_0$) which is calculated in that way is sufficient for the film not to break down in a steady-state situation, it is far from being so, in regard to formation of the film. Formation of the film requires a flow rate which is greater than ($d_0$) which may or may no be subsequently maintained in order to provide for proper operation of the apparatus.

Thus, apparatuses for producing evaporation by means of a falling film often comprise a pump which picks up a part of the liquid concentrated at the bottom of the exchanger and re-injects it into the liquid to be evaporated at the intake of the exchanger. That pump makes it possible to provide the exchanger with a flow rate which is independent of the flow rate of liquid to be evaporated and in particular greater than that which is required to form the film.

STATEMENT OF THE PROBLEM

However a problem arises when the operating conditions make it necessary to use a liquid flow rate ($d_1$) which is as close as possible to the minimum flow rate ($d_0$) without the possibility of increasing that flow rate over the whole of the surface of the exchanger for a period of time sufficient to form the film thereon, and without using a pump which picks up a part of the liquid at the bottom of the exchanger to recycle it to the intake. Such a problem arises in regard to the "potassium chloroaluminate" film-type exchanger serving for continuous absorptioncondensation of vapours of $ZrCl_4$ and $HfCl_4$ issuing from a separation column which functions in accordance with the process described by French Pat. No. 2 250 707=U.S. Pat. No. 4,021,531, said exchanger being referred to by Examples 1 and 2 of the present application, wherein the film flow rate must be adjusted therein to the quantity of vapours to be condensed, for satisfactory operation of the installation.

The invention also concerns an apparatus involving a gravity flow from a source, of the type comprising a tube nest or of the plate type, which uses that process. The "source" means here the volume of liquid that feeds this flow.

SUMMARY OF THE INVENTION

According to the process of the invention which is applied to an apparatus comprising one or more flow surfaces and in which the liquid source of the film apparatus is permanently fed with a flow rate ($d_1$) which is slightly higher than the minimum flow rate ($d_0$) corresponding to break-down of the film or films, said flow rate ($d_1$) being typically between 1.1 and 1.4 times ($d_0$):

(a) each film is first fed with a permanent flow rate ($kd_1$) corresponding to the feed flow rate ($d_1$) of the source, k being $=1$ and equal to $1/n$ in the case of n identical flow surfaces; (b) then during a short period or transient period the flow rate of each film, from the source which is still fed with the flow rate ($d_1$), is increased to a transient value ($kd_2$) permitting a continuous and regular film to be established over the whole of the flow surface or active surface; and (c) operation then returns for each film to the flow rate ($kd_1$), by suppressing the increase in flow rate to the film, the short periods for feeding the different films at their transient flow rates ($kd_2$) being displaced in respect of time in the case of a plurality of films.

Preferably the feed flow rate ($d_1$) of the source, that is to say for operation of the apparatus, does not exceed 1.3 times the minimum flow rate ($d_0$) so as to improve the level of exchange efficiency, for example in an absorption operation. In the case of an apparatus having a plurality of flow surfaces, for example 10 to 100 active surfaces, the applicants have found that the flow rates of the films of the tubes could vary by 10 to 15% from one tube to another, perhaps because of microscopic differences in their flow surfaces. Consequently and preferably the feed flow rate ($d_1$) is at a minimum $1.1 \times (d_0)$ for continuous operation. Moreover the transient flow rate ($kd_2$) of each film is preferably at least twice and still more preferably between twice and five times its minimum flow rate ($kd_0$) and the duration of the corresponding transient period ($\Delta t_2$) is of the order of from 1 to 5 seconds. The duration ($\Delta t_2$) is by convention that period during which the flow rate exceeds the permanent flow rate ($kd_1$).

DESCRIPTION OF THE PREFERRED EMBODIMENTS

When each active surface, for example a tube, is fed with the flow rate ($kd_1$) which is little higher than the limit flow rate ($kd_0$), the film generally does not form in a complete and regular fashion.

Figure 1:
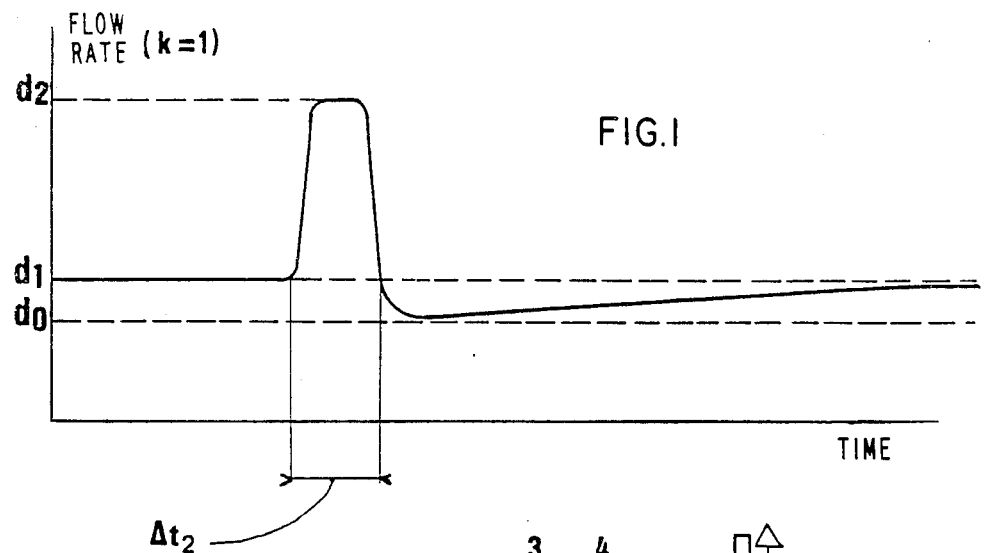
FIG. 1 is a graph of flow rate verses time for the formation of a liquid film on the inner surface of the tube.
Figure 2:
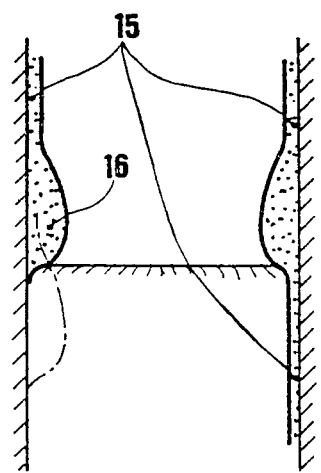
FIG. 2 shows in cross section a tube with a liquid film formed on its inner surface.

A transient flow rate ($kd_2$) of the order of twice the minimum flow rate ($kd_0$) is sufficient to establish the film. However it is preferred to use a greater flow rate ($kd_2$), which makes it possible to reduce the duration of the transient period and finally the amount of liquid used during that period. Indeed, it is found that that situation involves the formation of a liquid wave (annular in the case of a tube), which is much thicker than the film and which moves downwardly along the surface, repairing defects in the film as it passes and leaving behind it a film which is established over the entire surface. FIG. 1 shows a diagram (flow rate-time) in the section of the tube shown in FIG. 2 in which the film 15 is established after the wave 16 has passed, k being assumed therein to be equal to 1 to simplify matters.

In addition the amount of liquid used on each active surface during the transient period may be substantially reduced by increasing the flow rate used ($kd_2$) as the duration required to establish the film decreases very quickly when the thickness and weight of the wave are substantial. The endeavor will be to minimise the products ($kd_2 \times$ duration of the transient period) representing the total volumes of liquid used during those transient periods on the different active surfaces, as those volumes of liquid pass into the apparatus under less satisfactory conditions in regard to efficiency. For that purpose the transient flow rate ($kd_2$) and the duration of the transient period ($\Delta t_2$) of each film are preferably so selected that ($d_2/d_0$)$\times t_2$ is between 4 and 12 seconds, ($kd_2$) or ($\Delta t_2$) and better ($kd_2$) and ($\Delta t_2$) being selected in the preferred range or ranges indicated hereinbefore.

It should be noted that the increases in flow rate of the films derive from taking liquid from the volume or liquid of the source, the level of which is temporarily lowered as a result thereof. The low level attained as a consequence of the transition period or periods must still be sufficient for the films to be constantly fed with an overall flow rate which is higher than the minimum ($d_0$) (see FIG. 1), which in practice makes it necessary to arrive at a suitable choice in respect of the volume of the liquid source and the transient flow rates which may or may not be simultaneous.

After the transient period for each surface or each group of surfaces, the level of the source is progressively restored to its permanent operating level and the flow rate of each film rises again to the value ($kd_1$). All that takes place without the flow rate feeding the source having been modified. It is the source which served as a buffer reservoir and auto-regulation system.

When the apparatus comprises a plurality of active or flow surfaces and when they cannot be fed at the same time at their transient-state flow rates ($kd_2$) without the risk of causing an excessive drop in the level of the source, the operation of establishing the film on the different active surfaces by means of said flow rates ($kd_2$) is staggered in respect of time. For example, it is possible to feed one such surface at the transient flow rate ($kd_2$) when the film on the previous surface has been established and the level of the source has been restored to normal.

It is also possible successively to feed groups of a plurality of surfaces with transient flow rates ($kd_2$) by providing a time interval between each group so that the source can always feed all the groups at flow rates such as to ensure that the corresponding films do not break down, without dropping below the minimum ($d_0$). That makes it possible to reduce the variations in the total flow rate and therefore the influence thereof downstream of the installation, without increasing the volume of the source.

The feed for the flow surfaces at transient flow rates ($kd_2$) may also be used at predetermined intervals in the course of operation of the apparatus. That permits each film to operate with a permanent flow rate ($kd_1$) which is very close to the minimum flow rate ($kd_0$), for example between $1.1 \times (kd_0)$ and $1.2 \times (kd_0)$. It is also recommended when the characteristics of the film do not promote film stability. In both cases, it is thus possible to forestall break-downs in the film or at lesat it is possible to re-constitute the film easily and automatically if it is on the point of breaking down or has already done so.

The apparatuses which permit the process of the invention to be carried into effect are apparatuses in which the active surface or surfaces carrying the liquid film is or are fed by gravity from a volume of a source, or a volume of liquid contained in a distributor device, the source itself being fed at a constant flow rate equal to the flow rate of the film or films in the steady-state condition ($d_1$).

They are characterised in that they comprise a system for regulating the flow rate of each liquid film at a plurality of predetermined values ($kd_1$, $kd_2$) which occur in succession in respect of time. The various flow rates may occur in succession on the one hand on a given active surface and on the other hand on a plurality of surfaces or groups of active surfaces which are thus successively fed at transient flow rates ($kd_2$).

Those apparatuses use any known flow surface and preferably vertical tubes, the liquid film being established on the internal surface thereof. More precisely the invention also concerns an apparatus involving a flowing liquid film, comprising a liquid source which can be fed at a constant flow rate ($d_1$), at least one flow surface formed by an internal surface of a tube, and a distributor for passing the liquid from said source to said flow surface or surfaces, each tube being capped by a sleeve comprising a portion which is internal to the tube, said portion with the internal surface of the tube defining an annular chamber communicating the source with the flow surface, said sleeve being movable with respect to the tube between two positions giving different flow sections for communication between said source and said flow surface so as to feed said surface either at a permanent flow rate ($kd_1$) or at a selected transient flow rate ($kd_2$), k being $\leq 1$ and equal to $1/n$ in the case of n identical flow surfaces.

The permanent and transient flow rates are preferably selected in accordance with the process of the invention, operation of the apparatus being set forth in greater detail in the present description and the Examples.

The process and the apparatus according to the invention are used in particular in the process for separation of the tetrachlorides of Zr and Hf in accordance with French Pat. No. 2 250 707=U.S. Pat. No. 4,021,531, as is described in following Example 2.

EXAMPLE 1

Figure 3:
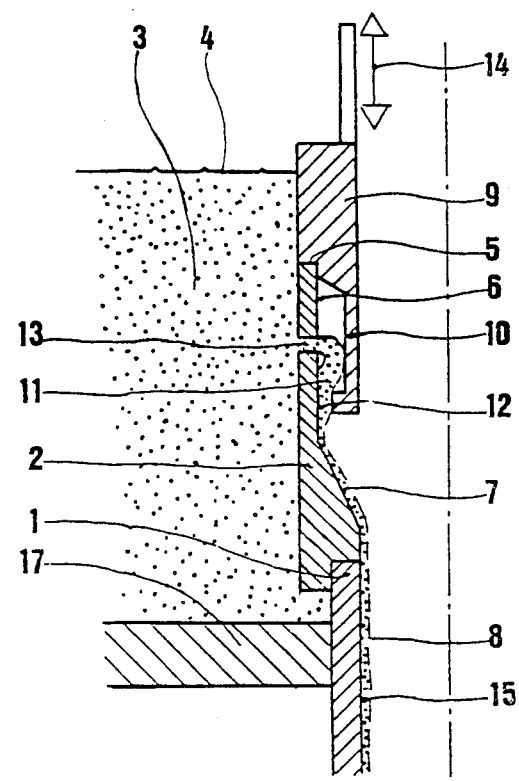
FIG. 3 shows in axial section a vertical flow tube discussed in example 1.

This Example concerns a vertical flow tube shown in axial section in FIG. 3, the arrangement described being reproduced in respect of all the flow tubes of the exchanger of Example 2. The tube 1 which is of a total height of 3 metres has a cylindrical circular internal portion 8 of a diameter of 54 mm. It passes through the upper tube plate 17 of the exchanger, above which is disposed the liquid source 3 formed by a volume fed permanently at a flow rate $d_1=50$ liters/hour, the minimum flow rate $d_0$ below which the film breaks down being $d_0=40$ liters/hour. The upper level 4 of the source volume is constant for the normal flow rate ($d_1$) for flow over the surface 15 of the tube 1.

The distributor system comprises:

an upward extension 2 of the tube 1, being fitted thereto by screwing or by being a press fit thereon, with a frustoconical zone 7, calibrated holes 13 of a diameter of 1.7 mm and provided through the wall of the tube at a distance of 70 mm below the level 4, the holes being capable of passing the steady-state flow rate $d_1$, and an upper edge 5 which is disposed below the level 4 of the source;

a movable sleeve 10 whose external surface, with the internal surface of the extension 2 on the tube 1, defines an annular distribution chamber 11 of a width of 3 mm communicating with the source by way of the holes 13 and with the lower part of the tube by way of an annular space 12 of small width (0.5 mm) which is disposed above the frustoconical zone 7, said sleeve 10 being extended upwardly by a vertical raised feeder head 9, the upper edge of which is above the level 4 of the liquid of the source and which rests in sealing engagement on the upper edge 5 of the extension 2 of the tube 1 in the position for a permanent flow rate $d_1$.

The sleeve 10 with its feeder head 9 is movable axially as indicated by the arrow 14 by virtue of a device which is not shown in the drawing. It constitutes the system for regulating the flow rate of the film.

Temporary lifting of the feeder head 9 permits a flow rate supplemental amount to pass between the lower edge of the feeder head 9 and the upper edge 5 of the extension 2 to produce the total transient flow rate of 150 liters/hour.

Operation of the apparatus in accordance with the process of the invention is as follows:

The feed for the source volume is fixed at 50 liters/hour. The level 4 of the source is 70 mm above the holes 13. The feeder head 9 resting on the upper edge 5 of the extension 2, the liquid passes only through the holes 13 at a flow rate $d_1$ of 50 liters/hour. However, at that flow rate, a liquid film is not established in a regular configuration over the entire flow surface 15 of the tube. The feeder head 9 is then raised by virtue of its control mechanism for a period of 2 seconds, thus temporarily allowing a supplementary flow rate which raises the total flow rate in the tube to the transient value $d_2=150$ liters/hour. Formed on the internal wall of the tube is a continuous liquid ring of small height which moves downwardly along the tube wall, establishing behind it a regular film covering the entire internal surface of the tube. During that transient period, a total volume of 83 $cm^3$ has passed, that is to say an additional amount of 55 $cm^3$ approximately in relation to the steadystate condition, which was taken from the source volume, the feed flow rate of which has remained constant.

The level 4 of the source has dropped by 20 mm during that period. After a period of 2 seconds, the feeder head 9 is moved down again onto the edge 5 of the extension 2. The flow rate through the holes 13 is then only slightly higher than the flow rate $d_0=40$ liters/hour. The level 4 of the source therefore progressively rises again and, in less than one minute, the flow rate through the holes 13 returns to the steady-state flow rate $d_1$ of 50 liters/hour.

EXAMPLE 2

There was a wish to provide for continuous condensation of the vapours of tetrachlorides of zirconium $ZrCl_4$ and hafnium $HfCl_4$ issuing from the separation column by absorption in a liquid solvent formed by "potassium chloroaluminate", in accordance with the process of French Pat. No. 2 250 707=U.S. Pat. No. 4,021,531.

A falling-film exchanger was made up, comprising 80 tubes similar to that of Example 1 which were grouped in 11 rows, with the gas and the liquid flowing in counter-flow relationship.

The raised feeder heads 9 of each row of tubes were simultaneously actuated by a lifting device as in Example 1.

A heat exchange fluid at a constant temperature circulates on the outside of the tubes and absorbs the heat given up by virtue of condensation of the vapours of the chlorides. The liquid-film tubes being used as a vapor absorber, it was possible to test the level of effectiveness of that process. With a constant amount of vapour to be absorbed and therefore with a constant amount of heat to be exchanged, the level of effectiveness of heat exchange and absorption and therefore the quality of the film are evaluated by reference to the difference in temperature between the heat exchange fluid passing into the exchanger and the liquid reaching the bottom of the exchanger. In the starting-up phase, at a flow rate of 50 liters/hour, a temperature difference of 8° C. was measured. After the device for actuating the feeder head had been operated to produce a transient flow rate of 150 liters/hour for a period of 2 seconds and then to return to the permanent flow rate of 50 liters/hour, it was found that the above-indicated temperature difference was reduced to 6° C and was maintained at that value. That corresponds to an increase in the level of efficiency of the exchanger from 10 to 25%, which is due to correctly establishing a regular film over the whole of the internal wall of the tube, without modifying the feed flow rate to the distributor volume.

EXAMPLE 3

A second arrangement for carrying out the process of the invention comprises a tube emerging from the bath of liquid and provided in its interior with a sleeve which is rotatable. The wall of the tube has holes therethrough, for the liquid to flow therethrough. In its lower part between its external surface and the internal surface of the tube the rotatable sleeve provides an annular liquid distribution chamber comparable to that of Example 1, into which the above-mentioned holes open. The sleeve comprises elements which can more or less close off the holes or close off a variable number of holes to permit a plurality of different liquid flow rates to pass alternately therethrough.

The section of the annular space by way of which the bottom of the annular chamber communicates with the tube is preferably equal to the sum of the flow sections of the holes at the time of maximum opening. The speed of rotation of the sleeve, the dimensions of the holes and the closure means are the elements which permit regulation of the duration and the rate of succession of the periods involving a transient flow and periods involving a permanent flow.

That alternative construction in which the transient flow is produced by rotary movement of the movable sleeve is applied, like those described above, to apparatuses comprising a plurality of flow tubes.

I claim:

1. A process for operating an apparatus such as an evaporator, absorber or exchanger, which functions using a flow of a plurality of liquid films over a plurality of flow surfaces, in which the liquid films are fed by gravity from a source which is permanently fed with a flow rate ($d_1$) which is slightly higher than the minimum flow rate ($d_0$) below which the film or films breaks or break down, comprising the steps of:
   (a) firstly feeding each film with a permanent flow rate ($kd_1$) corresponding to the feed flow rate ($d_1$) of the source, k being 1 and equal to 1/n in the case of n identical flow surfaces;
   (b) then for a brief period increasing the feed flow rate for each film to a transient value ($kd_2$) permitting a continuous film to be established over the whole of the corresponding flow surface;
   (c) then returning the operation to the permanent feed flow rate ($kd_1$) for the film in question; the short periods of feeding the flow surfaces at their transient flow rates ($kd_2$) being displaced in respect of time in relation to those different surfaces.

2. A process according to claim 1 in which the short periods of feeding the flow surfaces at their transient flow rates ($kd_2$) are displaced in respect of time, in relation to groups of said surfaces.

3. A process according to claims 1 or 2 wherein each transient flow rate ($kd_2$) is at least equal to twice the minimum feed flow rate for the corresponding flow surface ($kd_0$).

4. A process according to claim 3 wherein the transient flow rate ($kd_2$) is between 2 and 5 times the minimum flow rate ($kd_0$).

5. A process according to claim 4 wherein the product ($kd_2 \times \Delta t_2$) is minimised, $\Delta t_2$ being the duration of the corresponding transient period.

6. A process according to claim 5 wherein the transient flow rate ($kd_2$) and the duration of the corresponding transient period ($\Delta t_2$) are so selected that: ($d_2/d_0$)$\times \Delta t_2 = 4$ to 12 seconds.

7. A process according to claim 6 wherein the duration ($\Delta t_2$) is between 1 and 5 seconds.

8. A process according to claim 1 or 2 wherein the volume of said liquid source and said transient flow rates ($kd_2$) are so selected that the films are fed constantly with a total flow rate which is higher than the minimum flow rate ($d_0$).

9. A process according to claim 1 or 2 wherein step (b) of feeding each film at the transient flow rate ($kd_2$) is repeated at predetermined intervals to forestall breakdowns of the film or at least to re-constitute the film automatically.

10. Apparatus using a flowing liquid film, comprising a source of liquid which can be fed at a constant flow rate ($d_1$), at least one flow surface formed by an internal surface of a tube, and a distributor for passing the liquid from said source to said flow surface or surfaces, each said tube being capped by a sleeve comprising a portion internal to the tube, said portion with the internal surface of the tube defining an annular chamber communicating the source with the flow surface, said sleeve being movable with respect to the tube between two positions giving different flow sections for communication between said source and said flow surface, so as to feed said surface either at a permanent flow rate ($kd_1$) or at a transient flow rate ($kd_2$), k being $\leq 1$ and equal to 1/n in the case of n identical flow surfaces.

11. Apparatus according to claim 10 wherein the upper end of each tube is below the upper level of the source and wherein said movable sleeve carries a raised feeder head emerging from said source and sealingly fitting onto said upper end of the tube, said movable sleeve being connected to an axial motion device which can lift it, the position produced defining an annular passage between the upper end of the tube and the feeder head to permit the feed flow rate for the flow surface of the tube to assume the transient value ($kd_2$).

12. Apparatus according to claim 11 wherein the lifting movement of the movable sleeve is regulated in such a way as to produce a transient flow rate ($kd_2$) which is equal to 2 to 5 times the minimum flow rate without film break-down ($kd_0$), said permanent flow rate ($kd_1$) itself being between 1.1 and 1.4 times ($kd_0$).

13. Apparatus according to claim 11 wherein said annular chamber communicates with said source through holes provided in the wall portion of said tube defining said annular chamber, said holes constantly passing the permanent flow rate ($kd_1$) while the raised position of the sleeve provides a supplementary flow rate ($kd_2-kd_1$) without said holes being closed off.

14. Apparatus according to claim 10 wherein the annular chamber between the movable sleeve of each tube and the internal surface of said tube communicates with the source through holes provided in the wall of the tube and capable of passing the transient flow rate ($kd_2$), wherein the sleeve which is rotatable about the axis of the tube comprises elements capable of partially closing off the holes and closing off a larger or smaller number of holes, thereby varying the flow section providing the communication between the liquid source and each distribution chamber for feeding the corresponding flow surface either at the permanent flow rate ($kd_1$) or at the transient flow rate ($kd_2$).

15. Apparatus according to claim 11, 12 or 13 comprising a plurality of tubes distributed in groups of at least two tubes, the flow rate of each tube being regulated separately in respect of time.

16. Apparatus according to claim 15 wherein the feeder heads (9) of the tubes (1) of the same group are lifted together when all the tubes of said group are to be fed at their transient flow rates ($kd_2$).

17. Process according to claim 2 for the continuous absorption of vapours of tetrachlorides of Zr and Hf in a liquid solvent formed by potassium chloroaluminate.

* * * * *